United States Patent Office 3,226,353
Patented Dec. 28, 1965

3,226,353
COLOR CONCENTRATES OF GRAFT COPOLYMERS OF METHYL METHACRYLATE AND 2-HYDROXYMETHYL-5-NORBORNENE
Loy S. Engle, Harrington Park, N.J., assignor to Interchemical Corporation, New York, N.Y., a corporation of Ohio
No Drawing. Original application Dec. 18, 1961, Ser. No. 160,701. Divided and this application June 11, 1963, Ser. No. 293,553
5 Claims. (Cl. 260—29.8)

This application is a division of application Serial No. 160,701, filed December 18, 1961.

This invention relates to novel color concentrates and more particularly to novel color concentrates containing compounds of 2-hydroxymethyl-5-norbornene.

Color concentrates which are also known as color master batches and lacquer chips generally comprise pigment dispersed in a vehicle comprising a resin and, optionally, a plasticizer. Such color concentrates have been used in coatings, inks and, extensively in coloring plastics. According to conventional practices, the mixing or grinding to disperse the pigment in the resinous vehicles is generally accomplished on such apparatus as a 2-roll mill, Banbury mixer, ball mill and rod mill.

Color concentrates are used in the coloring of plastic articles including sheets, films, filaments, yarns as well as articles made by molding or extrusion. One of the greatest problems has been the production of color concentrates of uniform high quality which produce uniform dispersions in plastics. Poor pigment dispersion leads to poor color strength in plastic articles as well as rough surfaces, scratches on calendared or extruded film and sheeting breakage in monofilaments, and many other undesirable results. These problems have been particularly acute in the production of color concentrates to be used in the coloring of polyolefins particularly polypropylene and polyethylene.

I have now discovered novel color concentrates which provide uniform pigment dispersions of excellent color strength when used in plastics in general and polyolefins in particular. The vehicles of the novel color concentrates contain compounds of 2-hydroxymethyl-5-norbornene particularly either graft copolymers made by the addition polymerization of methyl methacrylate in the presence of 2-hydroxymethyl-5-norbornene homopolymer.

There follows a detailed description of said color concentrates and claims directed thereto. In said description and claims, all proportions are by weight unless otherwise stated.

Color concentrates comprising pigment dispersed in a vehicle comprising the above described graft copolymers have been found to be especially effective in coloring plastics in general. These graft copolymers may be made in accordance with the procedure set forth in copending application No. 55,148 filed on September 12, 1960, which is hereby incorporated and made a part of the disclosure of this application.

As set forth in said application, the 2-hydroxymethyl-5-norbornene is preferably homopolymerized in mass and is initiated by "catalysts" or polymerization initiators of the free radical type such as di-tertiary butyl peroxide that decompose at temperatures of 110° to 150° C. After the homopolymerization is completed, methyl methacrylate monomers are gradually added to the batch containing the preformed homopolymer to form the graft copolymer.

Included among the plastics for which color concentrates comprising pigment in the above described graft copolymer when used as a vehicle give excellent results are polyvinyl chlorides, polystyrenes, acrylic plastics, acrylonitrile as well as cellulosics such as cellulose acetate, cellulose propionate and cellulosoacetobutyrate.

It has been further found that the color concentrates containing the graft copolymer vehicles may be used to color polyethylene (both high and low density) as well as polypropylene. When using these compositions to color polypropylene, it is preferable to include in the vehicle a material which has a plasticizing effect on the graft copolymer. Such a material is preferably either compatible with or a solvent for the polypropylene as well as any resinous ingredients in the vehicle. Materials such as chlorinated triphenyls and biphenyls, dioctyl adipate, dioctyl azelate, dioctyl sebacate as well as diesters of 2-hydroxymethyl-5-norbornene and dicarboxylic acids such as adipic, sebacic and azelaic acids have been found to be very effective in this plasticizing function.

Any of the usual types of pigments, both organic and inorganic can be used in the process of the invention. Pigments which have been used successfully include phthalocyanine blue; phthalocyanine green; titanium dioxide, both the anatase and rutile types; chrome yellow; chrome green; carbon blacks; iron oxides; iron blues; cadmium colors; dianisidine blue; quinacridone red; and molybdate orange.

The improvement in the color strength and uniformity of dispersions produced by the color concentrates of this invention in the coloring of polyolefins such as polyproylene is especially significant with respect to white pigments such as titanium dioxide. Since these white pigments are used in producing tints of all colors, the ability of the color concentrate to give excellent dispersion and color strength results in excellent tints.

For the sake of convenience in describing this invention, the pigment vehicle may be considered to comprise a resinous binder and optionally a plasticizing material. The vehicle is in effect the continuous phase, preferably solid, in which the pigment is dispersed. The compositions being presently considered contain a graft copolymer of 2-hydroxymethyl-5-norbornene as the resinous binder.

The percentage of pigment in the color concentrates will vary primarily with the pigments used in the specific compositions. It is well known that some pigments, such as carbon black, because of their relatively large surface areas, have a greater tendency to absorb resinous materials than other such as chrome orange, chrome yellow or titanium dioxide, and for this reason the latter type pigments can be dispersed in less vehicle. Also, the specific gravities of the pigments are a factor in determining the best proportions of pigments to be used. For example, carbon black having a lower specific gravity could be present in less proportions than the heavier metallic oxide pigments. Generally speaking, the color concentrates prepared according to my invention will preferably contain from about 10 to 80 percent by weight of pigment depending for the most part on the particular pigment used. For instance, using a pigment such as carbon black, which has high absorptive powers for resinous materials and a relatively low specific gravity the pigment may represent only 10–20 percent of the total color concentrate.

With respect to the plasticizing material used, it is preferable that the chlorinated triphenyl constitute from 25% to 50% of the vehicle weight. Where dioctyl esters or the diesters of 2-hydroxymethyl-5-norbornene are used it is preferable that the plasticizer constitute from 10% to about 50% and most preferably from 14% to 28% of the vehicle weight.

When the color concentrates of this invention are used to color plastics, according to conventional practices, it may be expected that the oclor concentrate will be used in such quantity that the amount of pigment in the final colored plastic article will conventionally constitute up to 5% of the article weight. While higher proportions of pigment may be incorporated, such proportions are commercially uneconomical.

According to conventional practice for making color concentrates, the mixture of pigment and vehicle is placed on the mixing, milling or grinding apparatus and heated to a temperature at which the vehicle which is primarily resinous enters the fluid state and the milling or dispersion operation is carried out at said temperature, or higher. On a 2-roll mill, this fluid state may be readily characterized by the formation of a rolling bank in the nip of the rolls.

The following examples will further illustrate the practice of this invention:

*Example 1*

| | Parts |
|---|---|
| Chrome yellow pigment | 60 |
| A graft copolymer made by the addition polymerization of methyl methacrylate in the presence of 2-hydroxymethyl-5-norbornene homopolymer (homopolymer content in copolymer is about 20%) | 40 |

The above ingredients are mixed on a two-roll mill at a temperature of about 270° F. for a period of about 15 minutes, at which time, a homogeneous dispersion of pigment in the graft copolymer (continuous phase) is formed. The mixture is then removed from the mill, permitted to cool and broken into color concentrate granules or chips. Such chips may then be used for coloring plastics by incorporating said color concentrate chips into molten plastics in the conventional manner.

*Examples 2 through 5*

Example 1 is repeated using the graft copolymer of Example 1 and the following pigments in the following proportions:

| Example | Parts of Graft Copolymer | Pigment | Parts of Pigment |
|---|---|---|---|
| 2 | 75 | Carbon Black | 25 |
| 3 | 75 | Phthalocyanine Blue | 25 |
| 4 | 40 | Chrome Green | 60 |
| 5 | 75 | Quinacridone Red (U.S. Pat. 2,844,485). | 25 |

*Example 6*

| | Parts |
|---|---|
| Phthalocyanine green pigment | 25 |
| A graft copolymer made by the addition polymerization of methyl methacrylate in the presence of 2-hydroxymethyl-5-norbonene homopolymer | 50 |
| Arochlor 5460 (a chlorinated p-terphenyl having a 60% chlorine content by weight) | 25 |

The above ingredients are mixed on a two-roll mill at a temperature of about 250° F. for a period of 15 minutes, at which time, a homogeneous dispersion of pigment in the graft copolymer and Arochlor 5460 is formed. The mixture is then removed from the mill, permitted to cool and ground into color concentrate granules or chips.

Similar color concentrate compositions are also made in the same manner using phthalocyanine blue and quinacridone red pigments in place of phthalocyanine green. As controls, conventional color concentrates are prepared in the same manner using 25 parts pigment in a 75 parts polypropylene vehicle for each of the green, blue and red pigments of this example. These controls are prepared by milling on a 2-roll mill for about 15 minutes at 340° F.

Each of the three color concentrates and each of the corresponding control concentrates are then incorporated as coloring material into polypropylene in a conventional extrusion molding apparatus, 2 parts of color concentrate being used per 98 parts of polypropylene and each mixture is molded into a slab. The slabs containing the graft copolymer-Arochlor color concentrates display from 50% to 100% increase over the control in color strength as well as excellent uniformity in color. At 100× magnification under a microscope, there is an absence of color agglomerates. The controls display a substantial degree of color agglomeration.

*Example 7*

| | Parts |
|---|---|
| Titanium dioxide | 40 |
| Graft copolymer of Example 6 | 40 |
| Arochlor 5460 | 20 |

The procedure of Example 6 is repeated using the above ingredients and the resulting color concentrate chip is compared with a color concentrate chip of 40% titanium dioxide and 60% polypropylene. Both chips are incorporated into a polypropylene composition in extrusion molding apparatus and slabs are prepared and compared. Besides greater opacity, the graft-copolymer, Arochlor and pigment color concentrate-containing slab is uniformly pigmented. On the other hand, the control, in marked contrast, has a great number of color agglomerates and a pigment dispersion lacking in uniformity.

*Example 8*

Example 6 is repeated using the same conditions and proportions except that the color concentrates are incorporated into linear polyethylene. The results are the same as in Example 6.

*Example 9*

Example 6 is repeated using the same conditions and proportions except that only the green color concentrate is tried and that is incorporated into acrylonitrile rubber with excellent results.

*Example 10*

| | Parts |
|---|---|
| Medium cadmium red pigment | 25 |
| The graft copolymer described in Example 6 | 50 |
| Arochlor 5460 | 25 |

A color concentrate of the above ingredients is prepared in accordance with the procedure of Example 1. The color concentrate chips are then incorporated as coloring material into polystyrene in conventional extrusion molding apparatus, 2 parts of color concentrate being used per 98 parts of polystyrene and molded into a slab. The resulting slab displays excellent color strength as well as excellent uniformity of pigment dispersion.

The color concentrate of Example 10 is incorporated into polyvinyl chloride and polypropylene with the same excellent results.

*Example 11*

| | Parts |
|---|---|
| Phthalocyanine green | 30 |
| Graft copolymer described in Example 1 | 50 |
| Dioctyl azelate | 20 |

A color concentrate of the above ingredients is prepared in accordance with the procedure of Example 1. The color concentrate chips are then incorporated as coloring material into polystyrene in conventional extrusion molding apparatus, 2 parts of color concentrate being used per 98 parts of polypropylene and molded into a slab. The resulting slab displays excellent color strength and good uniformity of pigment dispersion.

*Example 12*

Example 11 is repeated using the same ingredients, proportions and conditions except that dioctyl adipate is used instead of dioctyl azelate. The results are very similar to those of Example 11. Dioctyl sebacate may also be substituted for dioctyl azelate with similar results.

*Example 13*

Example 11 is repeated using the same ingredients and proportions except that carbon black pigment is used in place of phthalocyanine green pigment and in place of dioctyl azelate, there is used the diester of 2-hydroxymethyl-5-norbornene and azelaic acid. The resulting slab displayed even better color strength and uniformity of pigment dispersion than did the slab of Example 11.

*Example 14*

| | Parts |
|---|---|
| Quinacridone red (U.S. Pat. 2,844,485) | 25 |
| Graft copolymer described in Example 1 | 55 |
| Diester of 2-hydroxymethyl-5-norbornene and sebacic acid | 20 |

The resulting slab displayed properties equivalent to those of the slab in Example 13.

*Example 15*

Example 14 is repeated using the same ingredients, proportions and conditions except that the diester is the diester of 2-hydroxymethyl-5-norbornene and adipic acid. The results are the same as in Example 14.

Although the invention has been particularly described with respect to the preparation of color concentrate compositions for use in coloring plastics, it is obvious that it is not limited to such systems. For instance, color concentrates prepared by the process of the invention can be used in the preparation of pigmented coatings, inks, etc. A common practice in the protective coating and ink industries is to mill pigments into the vehicles on a 2-roll mill to obtain pigmented chip dispersions or color concentrates and then these pigmented chips are dispersed in the desired vehicle.

While the color concentrate compositions produced according to the above examples have been primarily solids, it will be obvious that the color concentrates may be used in the form of pastes which may be made according to conventional techniques e.g. mixing the solid color concentrate chip with a solvent or by increasing the plasticizer content of the color concentrate compositions.

Numerous other pigments, both organic and inorganic, have been used in our process, however, since the procedure is analogous in all cases it will be unnecessary to repeat them here. From the description of the invention in the above illustrative examples it will be apparent to those skilled in the art that numerous modifications of the invention may be practiced within the valid scope of the invention as defined in the appended claims.

What is claimed is:

1. A color concentrate composition consisting essentially of pigment dispersed in a vehicle comprising (A) a graft copolymer made by the addition polymerization of methyl methacrylate in the presence of 2-hydroxymethyl-5-norbornene homopolymer and (B) a diester of 2-hydroxymethyl-5-norbornene and a dicarboxylic acid selected from the group consisting of adipic, azelaic and sebacic acids, said pigment constituting from 10 to 80% of the composition weight and said diester constituting from 10 to 50% of the vehicle weight.

2. The color concentrate composition of claim 1 wherein said diester is a diester of 2-hydroxymethyl-5-norbornene and azelaic acid.

3. The color concentrate composition of claim 1 wherein said diester is a diester of 2-hydroxymethyl-5-norbornene and adipic acid.

4. The color concentrate composition of claim 1 wherein a diester is a diester of 2-hydroxymethyl-5-norbornene and sebacic acid.

5. The color concentrate composition of claim 1 wherein said vehicle is a solid.

References Cited by the Examiner

UNITED STATES PATENTS

| 2,301,206 | 11/1942 | France et al. | 260—649 |
| 2,526,395 | 10/1950 | Nichols et al. | 260—31.8 |
| 2,649,382 | 8/1953 | Vesce | 260—41 |
| 2,985,611 | 5/1961 | Gaylord et al. | 260—30.8 |
| 3,035,008 | 5/1962 | Gaylord | 260—45.5 |

FOREIGN PATENTS

| 601,762 | 5/1948 | Great Britain. |

OTHER REFERENCES

Buttrey, "Plasticizers," 2nd Edition, Cleaver-Hume Press Ltd., 1957, pages 71 and 77.

MORRIS LIEBMAN, *Primary Examiner.*